United States Patent
Gomes et al.

(10) Patent No.: US 8,672,411 B2
(45) Date of Patent: Mar. 18, 2014

(54) VEHICLE SEAT CUSHION WITH INTEGRATED VENTILATION

(75) Inventors: Leonardo Gomes, Rochester Hills, MI (US); Philippe Duhamel, Longjurneau (FR)

(73) Assignee: Faurecia Automotive Seating, LLC, Troy, MI (US)

(*) Notice: Subject to any disclaimer, the term of this patent is extended or adjusted under 35 U.S.C. 154(b) by 431 days.

(21) Appl. No.: 13/048,432

(22) Filed: Mar. 15, 2011

(65) Prior Publication Data

US 2011/0227389 A1 Sep. 22, 2011

Related U.S. Application Data

(60) Provisional application No. 61/316,198, filed on Mar. 22, 2010.

(51) Int. Cl.
A47C 7/02 (2006.01)
A47C 7/72 (2006.01)

(52) U.S. Cl.
USPC .................. 297/452.46; 297/180.13

(58) Field of Classification Search
USPC ............. 297/452.41, 452.42, 452.46, 452.47, 297/452.43, DIG. 3, 180.1, 180.13
See application file for complete search history.

(56) References Cited

U.S. PATENT DOCUMENTS

| | | | |
|---|---|---|---|
| 2,012,042 A * | 8/1935 | Gerlofson et al. | 267/145 |
| 3,171,691 A | 3/1965 | Buehrig | |
| 3,326,601 A | 6/1967 | Vanderbilt et al. | |
| 3,681,797 A * | 8/1972 | Messner | 297/180.13 |
| 3,902,754 A | 9/1975 | Braeuning | |
| 4,580,837 A | 4/1986 | Bayley | |
| 4,746,168 A | 5/1988 | Bracesco | |
| 4,965,899 A | 10/1990 | Sekido et al. | |
| 5,226,188 A * | 7/1993 | Liou | 5/653 |
| 5,288,136 A | 2/1994 | Webber et al. | |
| 5,518,802 A | 5/1996 | Colvin et al. | |
| 5,572,704 A | 11/1996 | Skaja et al. | |
| 5,637,076 A | 6/1997 | Hazard et al. | |
| 5,660,438 A | 8/1997 | Tedesco | |
| 5,806,928 A | 9/1998 | Gattuso et al. | |
| 5,833,321 A * | 11/1998 | Kim et al. | 297/452.42 |
| 5,976,451 A | 11/1999 | Skaja et al. | |
| 6,029,962 A | 2/2000 | Shorten et al. | |
| 6,098,313 A | 8/2000 | Skaja | |
| 6,390,553 B1 | 5/2002 | LeBlanc | |
| 6,777,062 B2 | 8/2004 | Skaja | |
| 7,033,666 B2 | 4/2006 | Skaja | |

(Continued)

FOREIGN PATENT DOCUMENTS

GB 754248 8/1956

OTHER PUBLICATIONS

International Search Report for PCT/US2010/023713, dated Apr. 9, 2010, twelve pages.

(Continued)

*Primary Examiner* — Milton Nelson, Jr.
(74) *Attorney, Agent, or Firm* — Reising Ethington P.C.

(57) ABSTRACT

A vehicle seat includes a seat bottom and a seat back extending upwardly from the seat bottom. A cushion is included in each of the seat bottom and seat back. A stream of air is provided to the seat bottom and back to reach a passenger seated on the vehicle seat.

23 Claims, 12 Drawing Sheets

(56) References Cited

U.S. PATENT DOCUMENTS

| | | |
|---|---|---|
| 7,083,236 B1 * | 8/2006 | Smith ................ 297/452.43 |
| 7,574,760 B2 | 8/2009 | Foley et al. |
| 2002/0050077 A1 | 5/2002 | Wang et al. |
| 2002/0056709 A1 | 5/2002 | Burt |
| 2002/0119276 A1 | 8/2002 | Skaja |
| 2004/0067820 A1 | 4/2004 | Noble et al. |
| 2004/0245811 A1 | 12/2004 | Bevan et al. |
| 2005/0074586 A1 | 4/2005 | Skaja |
| 2005/0126038 A1 | 6/2005 | Skaja et al. |
| 2006/0177635 A1 | 8/2006 | Pepe et al. |
| 2006/0277685 A1 | 12/2006 | Foley et al. |
| 2008/0166524 A1 | 7/2008 | Skaja et al. |
| 2012/0280554 A1 * | 11/2012 | Brncick et al. ........... 297/452.41 |

OTHER PUBLICATIONS

International Search Report for PCT/US10/57048, dated Jan. 27, 2011, eleven pages.

* cited by examiner

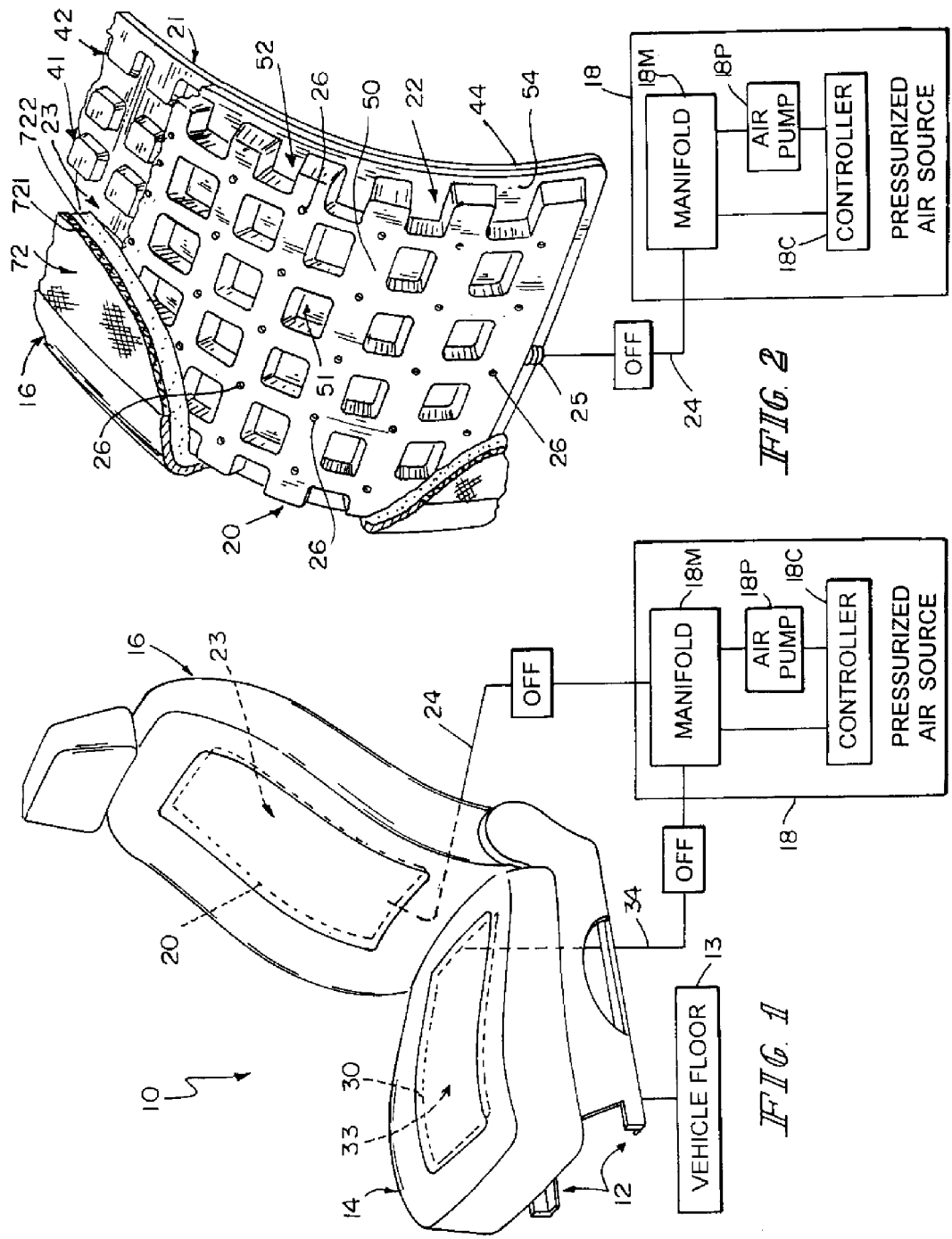

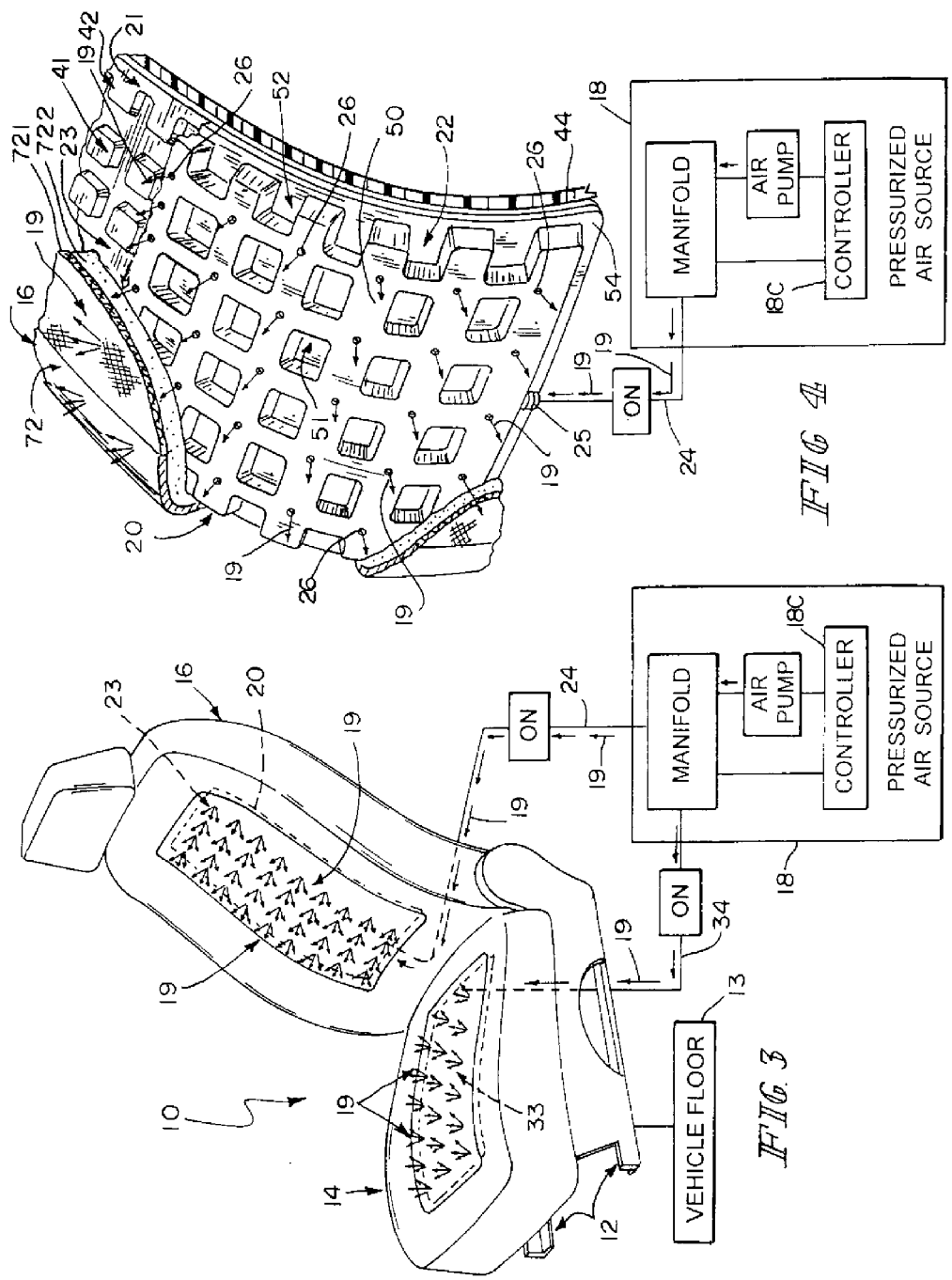

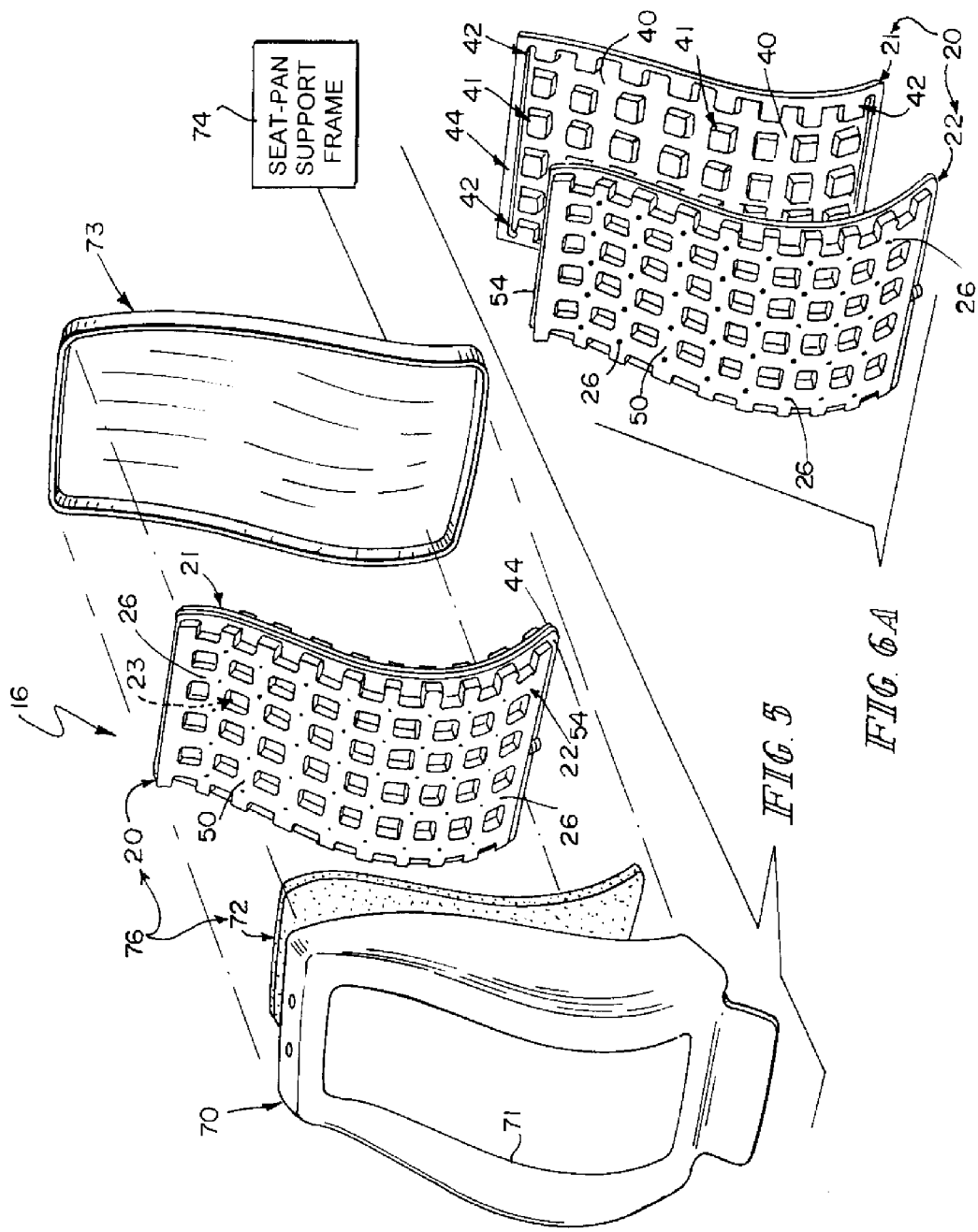

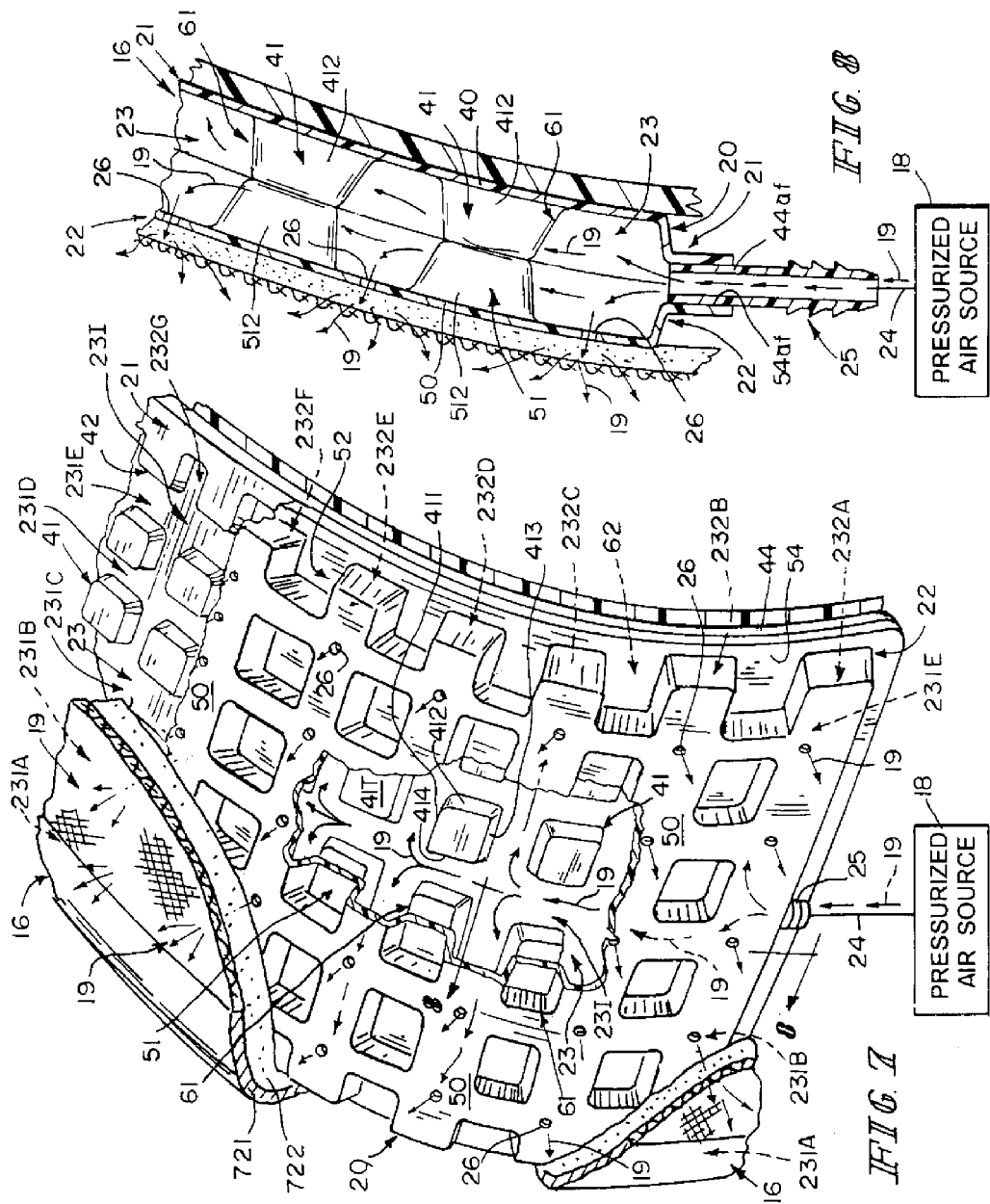

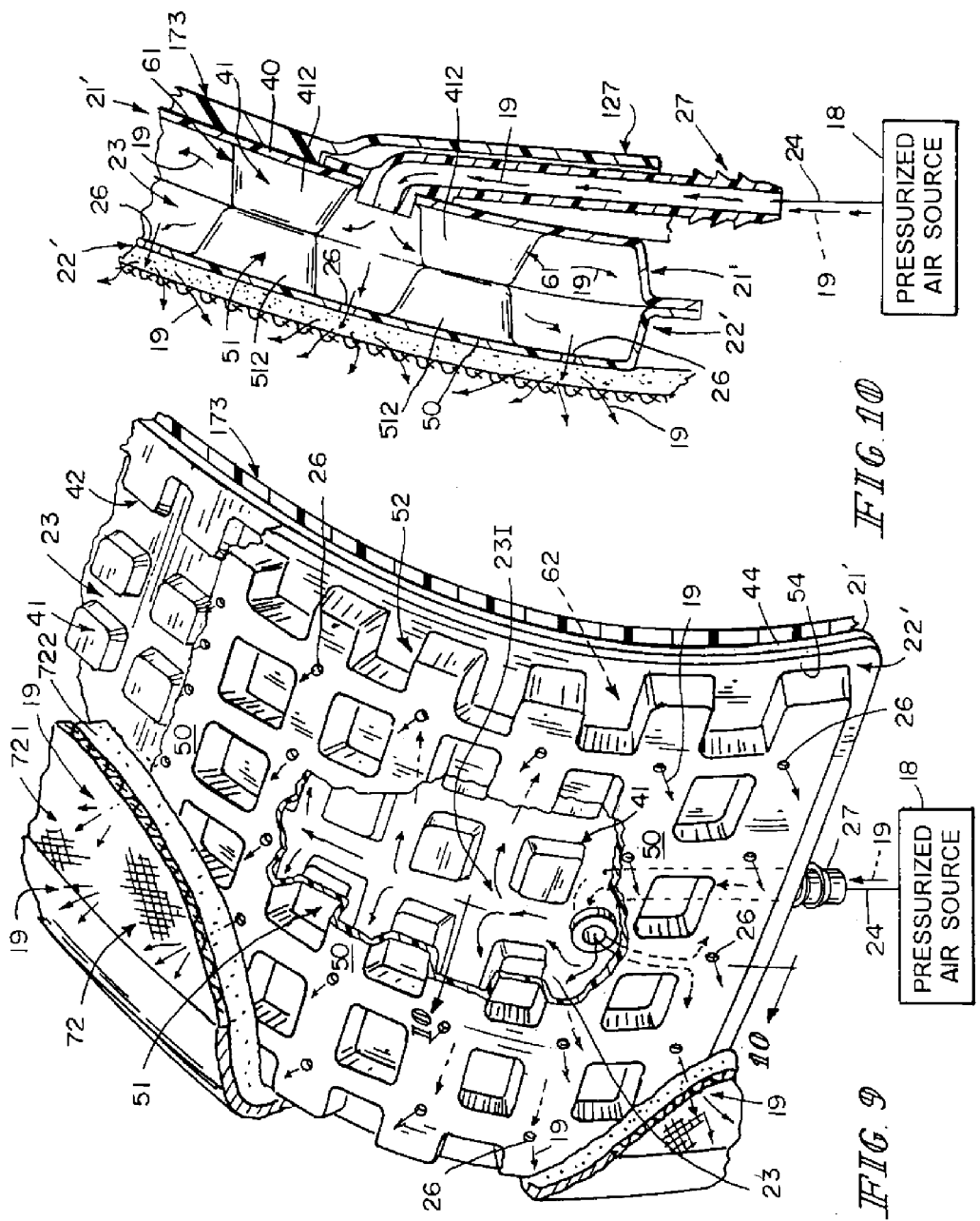

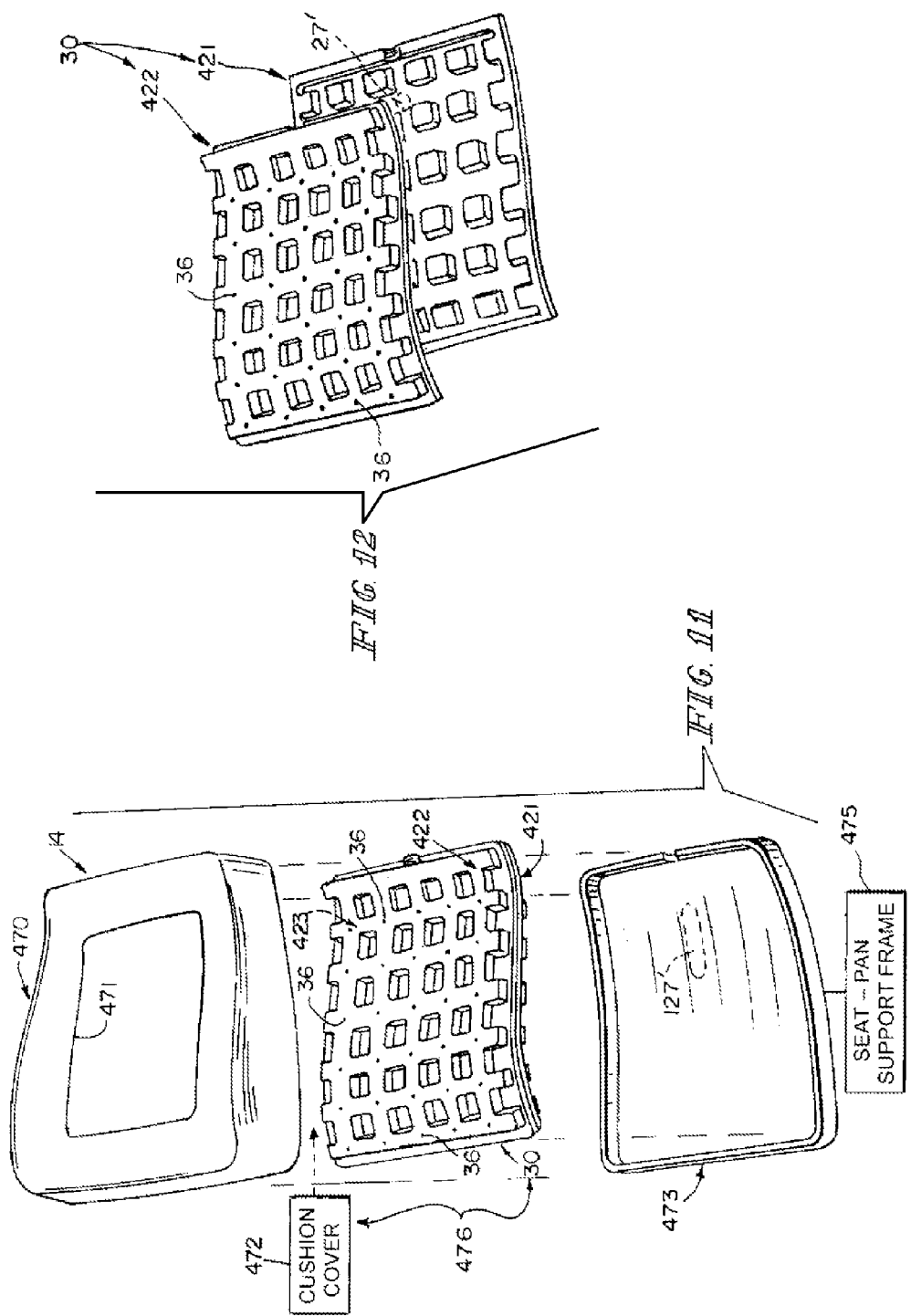

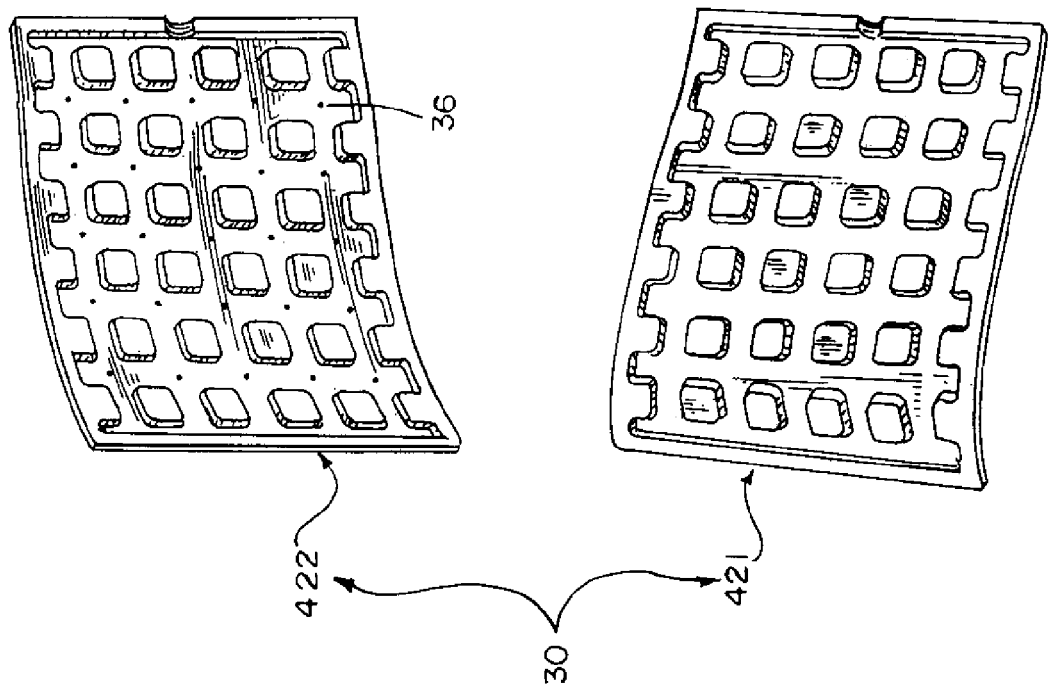

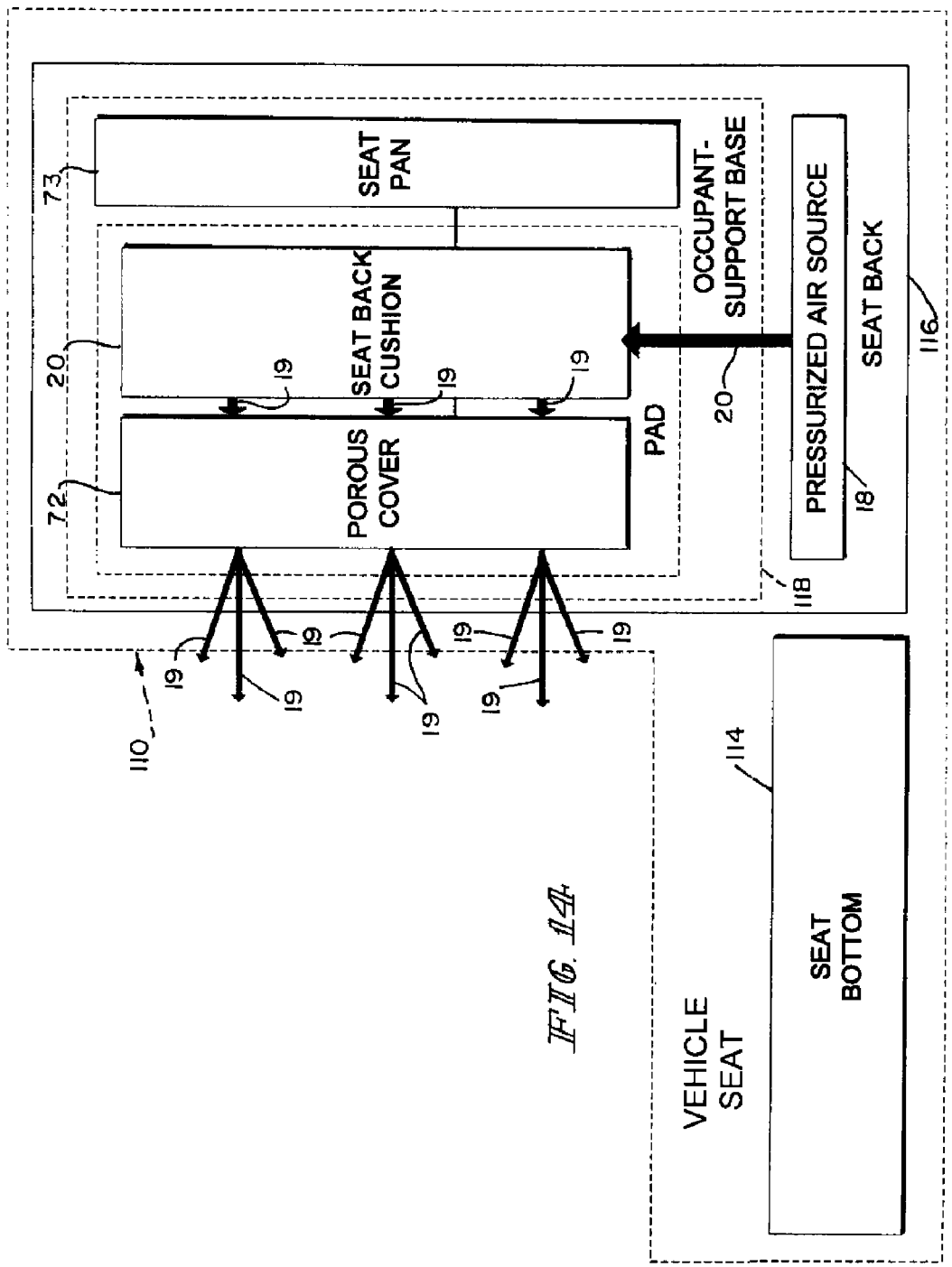

VEHICLE SEAT CUSHION WITH INTEGRATED VENTILATION

PRIORITY CLAIM

This application claims priority under 35 U.S.C. §119(e) to U.S. Provisional Application Ser. No. 61/316,198, filed Mar. 22, 2010, which is expressly incorporated by reference herein.

BACKGROUND

The present disclosure relates to a vehicle seat, and particularly to a vehicle seat including a seat back and seat bottom. More particularly, the present disclosure relates to a seat back including a cushion.

SUMMARY

A vehicle seat in accordance with the present disclosure includes an occupant-support base. The occupant-support base may be either a seat bottom or seat back. The occupant-support base may include a seat pan mounted on a seat-pan support frame and a cushion coupled to the seat pan.

In illustrative embodiments, the cushion includes a deformable elastic bed made of an elastomeric material that is configured to support a user sitting on the vehicle seat. The cushion is further formed to include an air plenum that is configured to receive pressurized air from a pressurized air source and a plurality of air-discharge ports opening into the air plenum to cause the pressurized air to be communicated from the air plenum to a user sitting on the vehicle seat.

In illustrative embodiments, the cushion comprises a monolithic first sheet made of an elastomeric material and a monolithic second sheet made of an elastomeric material. The monolithic first sheet is formed to include an outer portion of the deformable elastic bed, and an outer portion of the air plenum, and the plurality of air-discharge ports. The monolithic second sheet includes an inner portion of the deformable elastic bed and an inner portion of the air plenum. When the monolithic first sheet is mated to the monolithic second sheet, the deformable elastic bed and the air plenum are formed.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of a ventilated vehicle seat in accordance with the present disclosure showing a pressurized air source coupled in fluid communication to a cushion included in the seat bottom and to a cushion included in the seat back;

FIG. 2 is an enlarged perspective view of a portion of the seat back, with portions broken away to reveal outer and inner sheets included in the cushion provided in the seat back and mated to form an air plenum located therebetween and coupled in fluid communication to a manifold provided in the pressurized air source, and showing that the outer sheet is formed to include an array of air-discharge ports opening into the air plenum;

FIG. 3 is a view similar to FIG. 1 suggesting that pressurized air extant in the manifold is flowing into the air plenum formed in each of the cushions and showing that pressurized air is exiting the air plenum formed in the seat-bottom cushion and is also exiting the air plenum formed in the seat-back cushion;

FIG. 4 is a view similar to FIG. 2 showing outward flow of pressurized air from the air plenum in the seat-back cushion through air-discharge ports formed in the outer sheet of the seat-back cushion and through permeable layers included in a cushion cover included in the seat back and coupled to the seat-back cushion and showing mating engagement of the inner sheet and a seat pan also included in the ventilated vehicle seat;

FIG. 5 is an exploded perspective assembly view of the seat back of FIGS. 1-4 showing that the seat back includes, from left to right, a frame formed to include a central aperture, a porous cushion cover, a cushion, and a seat pan arranged to mate with the inner sheet included in the cushion and configured to mount on a seat-pan support frame;

FIG. 6A is an exploded perspective assembly view of the seat-back cushion of FIG. 5 showing the outer sheet (on the left) and the inner sheet (on the right);

FIG. 7 is an enlarged view of the seat-back cushion and adjacent seat pan shown in FIG. 4 with portions of the outer sheet broken away to reveal the air plenum formed between the outer and inner sheets and to show diagrammatically the flow of pressurized air around deformable posts formed by mating engagement of companion outer and inner domes included in the outer and inner sheets;

FIG. 8 is an enlarged sectional view taken along line 8-8 of FIG. 7;

FIG. 9 is a view similar to FIG. 7 of a seat pan and seat-back cushion in accordance with another embodiment of the present disclosure with portions of the outer sheet broken away to reveal the air plenum formed between the outer and inner sheets and to show that pressurized air is discharged into the air plenum through an air-supply port formed in the inner sheet of the seat-back cushion;

FIG. 10 is an enlarged sectional view taken along line 10-10 of FIG. 9 showing that the seat pan is formed to include a conduit channel aligned to communicate with the air-supply port formed in the inner sheet and that an air-supply conduit is arranged to extend through the conduit channel to discharge pressurized air from the source of pressurized air into the air plenum through the air-supply port;

FIG. 11 is an exploded perspective assembly view of the seat bottom of FIG. 1 showing that the seat bottom includes, from top to bottom, a frame formed to include a central aperture, a porous cushion cover (suggested diagrammatically), a seat-bottom cushion, and a seat pan arranged to mate with an inner sheet included in the seat-bottom cushion and configured to mount on a seat-pan support frame;

FIG. 12 is an exploded perspective assembly view of the seat-bottom cushion of FIGS. 1 and 11 showing the outer sheet (on top) and the inner sheet (on the bottom);

FIG. 13 is another view of the outer and inner sheets included in the seat-bottom cushion of FIGS. 1, 11, and 12;

FIG. 14 is a diagrammatic view of a ventilated vehicle seat in accordance with the present disclosure showing an occupant-support base comprising a seat back including a seat pan and a pad comprising a seat-back cushion and a porous cover and showing that pressurized air from a pressurized air source flows through the seat-back cushion and the porous cover to reach a passenger seated on the ventilated vehicle seat;

DETAILED DESCRIPTION

Figure 10A:
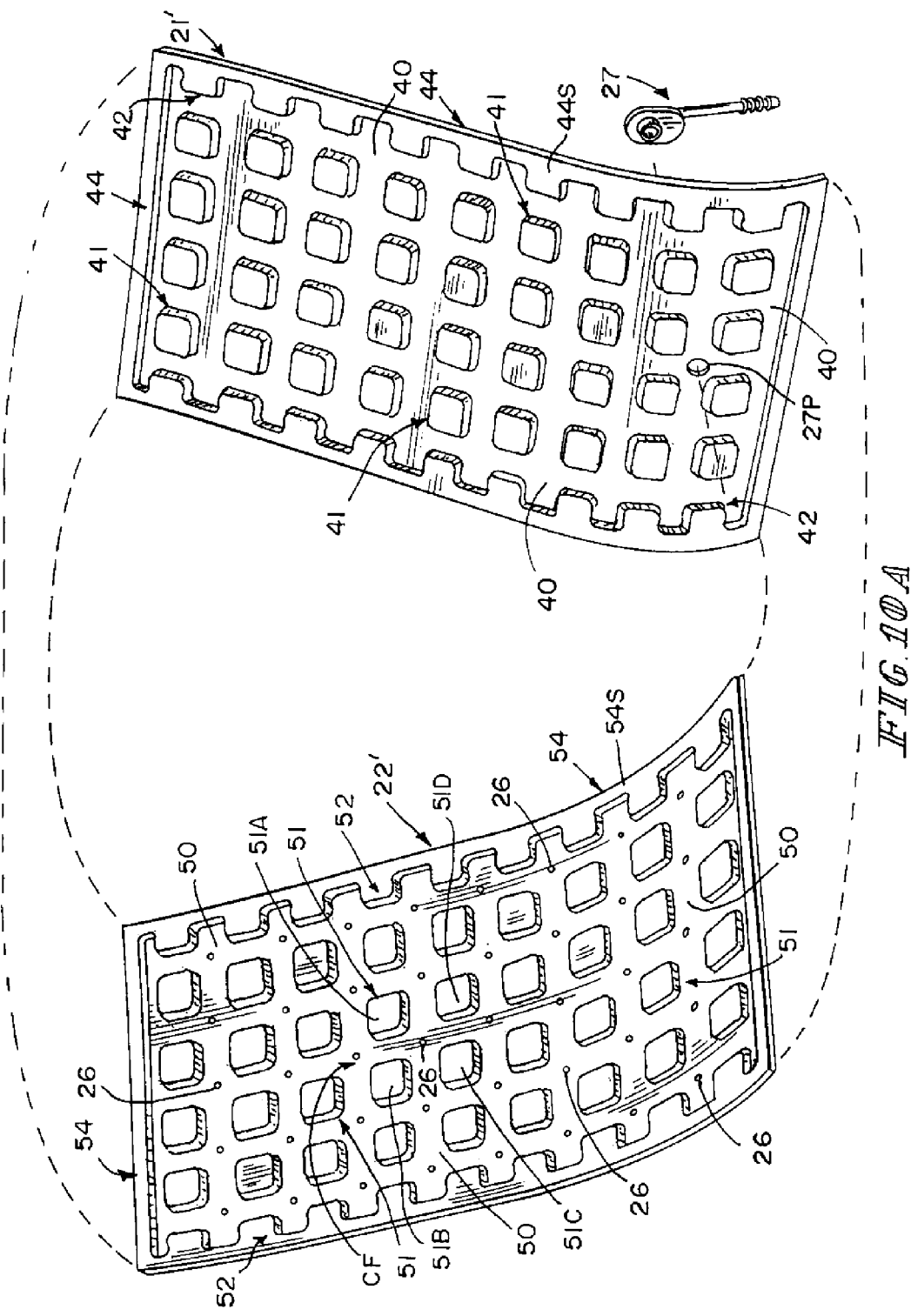
FIG. 10A is an enlarged perspective assembly view showing the outer and inner sheets included in the seat-back cushion and the air-supply conduit of FIGS. 9 and 10.

A ventilated vehicle seat 10 includes a foundation 12 adapted to be anchored to a vehicle floor 13, a seat bottom 14 mounted on foundation 12, and a seat back 16 arranged to extend upwardly away from seat bottom 14 as suggested in FIG. 1. Ventilated vehicle seat 10 also includes a pressurized air source 18 coupled to each of seat bottom 14 and seat back 16 as suggested in FIG. 1 to provide pressurized air to seat bottom 14 and seat back 16 to provide ventilation to a passenger (not shown) sitting on ventilated vehicle seat 10. An illustrative seat back 16 in accordance with a first embodiment of the present disclosure is shown in FIGS. 2-8 and another illustrative seat back 216 is shown in FIGS. 9-10A. An illustrative seat bottom 14 is shown in FIGS. 11-13.

Seat back 16 includes a cushion 20 shown diagrammatically in FIG. 1 and illustratively in FIGS. 2 and 5. Seat-back cushion 20 is formed to include an air plenum 23 coupled in fluid communication to pressurized air source 18 via a hose 24 as suggested in FIGS. 1, 2, and 7. Pressurized air 19 extant in seat-back air plenum 23 is discharged through air-discharge ports 26 formed in seat-back cushion 20 to reach a passenger seated on ventilated vehicle seat 10 when a controller 18C included in pressurized air source 18 is activated to cause pressurized air 19 to flow into seat-back air plenum 23 through hose 24 as suggested in FIGS. 3, 4, 7, and 8.

Seat bottom 14 includes a cushion 30 shown diagrammatically in FIGS. 1 and 3 and illustratively in FIGS. 11-13. Seat-bottom cushion 30 is formed to include an air plenum 33 coupled in fluid communication to pressurized air source 18 via a hose 34 as suggested in FIGS. 1 and 3. Pressurized air 19 extant in seat-bottom air plenum 33 is discharged through air-discharge ports 36 formed in seat-bottom cushion 30 to reach a passenger seated on ventilated vehicle seat 10 when controller 18C is activated as suggested in FIG. 3.

Seat-back cushion 20 includes inner and outer sheets 21, 22 as shown, for example, in FIGS. 2, 5, 6A, and 6B. Inner sheet 21 is coupled to outer sheet 22 to establish a deformable elastic bed and form seat-back air plenum 23 therebetween. Each of inner and outer sheets 21, 22 is a monolithic element made of a deformable, elastic plastics material.

Figure 6B:
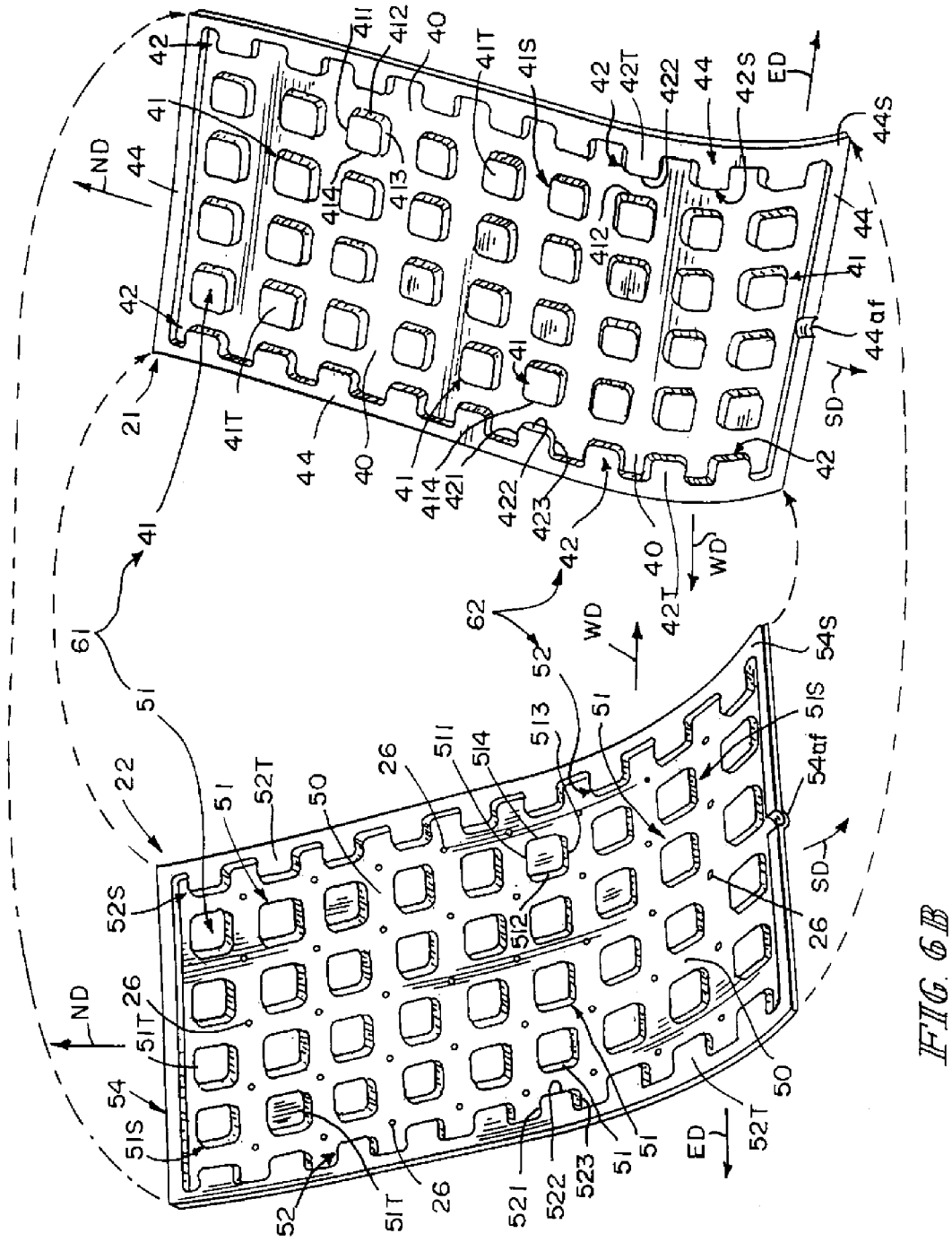
FIG. 6B is an enlarged view of the sheets shown in FIG. 6A showing that the outer sheet (on the left) includes an outer web formed to include quite a few air-discharge ports, an array of spaced-apart outer domes coupled to the outer web and arranged to extend toward the inner sheet, and an outer perimeter ridge coupled to a perimeter border of the outer web and arranged to surround the array of spaced-apart outer domes and showing that the inner sheet (on the right) includes an inner web, an array of spaced-apart inner domes coupled to the inner web and arranged to extend toward the outer sheet, and an inner perimeter ridge coupled to a perimeter border of the inner web and arranged to surround the array of spaced-apart inner domes and mate with the outer perimeter ridge as suggested in FIG. 4 to form the air plenum between the outer and inner sheets.

Inner sheet 21 of seat-back cushion 20 includes an inner web 40, an array of spaced-apart inner domes 41, 42, and an inner perimeter ridge 44 as shown, for example, in FIG. 6B. Inner web 40 provides an inner exterior surface arranged to mate with a seat pan included in seat back 16 as suggested in FIGS. 4 and 5. Inner domes 41, 42 are coupled to inner web 40 and arranged to extend toward outer sheet 22 as suggested in FIG. 6A. Inner perimeter ridge 44 is coupled to a perimeter border of inner web 40 as shown in FIG. 6B and arranged to surround the array of spaced-apart inner domes 41, 42 and extend from inner web 40 toward outer sheet 22 as suggested in FIGS. 6A and 6B.

Outer sheet 22 of seat-back cushion 20 includes an outer web 50, an array of spaced-apart outer domes 51, 52, and an outer perimeter ridge 54 as shown, for example, in FIG. 6B. Outer web 50 provides an outer exterior surface as suggested in FIGS. 5 and 6A. Outer domes 51, 52 are coupled to outer web 50 and arranged to extend toward inner sheet 21 as suggested in FIG. 6A. Outer perimeter ridge 52 is coupled to a perimeter border of outer web 50 as shown in FIG. 6B an arranged to surround the array of spaced-apart outer domes 51, 52 and extend from outer web 50 toward inner sheet 21 as suggested in FIGS. 6A and 6B.

Seat-back cushion 20 is shown, for example, in FIGS. 7 and 8 and is formed by mating engagement of inner and outer sheets 21, 22 in a manner suggested in FIG. 6B. Each of inner and outer sheets 21, 22 includes a central interior region surrounded by a peripheral region extending along a perimeter ridge thereof.

Domes 41, 51 are interior domes in seat-back cushion 20 as suggested in FIGS. 6B and 7. Inner domes 41 in inner sheet 21 are arranged to lie in a central interior region of inner sheet 21 and away from inner perimeter ridge 44 as suggested in FIG. 6B. Similarly, outer domes 51 in outer sheet 22 are arranged to lie in a central interior region of outer sheet 22 and away from outer perimeter ridge 54 as also suggested in FIG. 6B.

Domes 42, 52 are peripheral domes in seat-back cushion 20 as suggested in FIGS. 6B and 7. Inner domes 42 in inner sheet 21 are arranged to lie in a peripheral region of inner sheet 21 extending along and just inside inner perimeter ridge 44 as suggested in FIG. 6B. Similarly, outer domes 52 in outer sheet are arranged to lie in a peripheral region of outer sheet 22 extending along and just inside outer perimeter ridge 54 as also suggested in FIG. 6B.

Inner and outer sheets 21, 22 are arranged to align the interior inner and outer domes 41, 51 in registry with one another to cause each interior outer dome 51 to mate with a companion interior inner dome 41 to form an interior deformable post 61 extending from outer web 50 to inner web 48 as suggested in FIGS. 7-10. Inner and outer sheets 21, 22 are also arranged to align the peripheral inner and outer domes 42, 52 in registry with one another to cause each peripheral outer dome 52 to mate with a companion peripheral inner dome 42 to form a peripheral deformable post 62 extending from outer web 50 to inner web 40. Interior deformable posts 41, 51 and peripheral deformable posts 42, 52 are configured to deform elastically whenever a passenger presses against cushion 20 when seated on vehicle seat 10. Inner and outer perimeter edges 44, 54 of inner and outer sheets 21, 22 are mated to establish seat-back air plenum 23 in a space bounded by: (1) the inner and outer webs 40, 50; (2) the deformable posts 61, 62 located between and coupled to inner and outer webs 40, 50; and (3) the mating inner and outer perimeter ridges 44, 54.

Each inner dome 41, 42 in inner sheet 21 includes a top wall 41T (or 42T) arranged to lie in spaced-apart relation to inner web 40 and a side wall 41S (or 42S) arranged to interconnect the companion top wall 41T (or 42T) and inner web 40 as suggested in FIG. 6B. Inner domes 41 comprise a first group of (interior) inner domes in a central interior region of inner sheet 21 and inner domes 42 comprise a second group of (peripheral) inner domes in peripheral regions of inner sheet 21 as suggested in FIG. 6B. In illustrative embodiments, each dome 41, 42 has a frustopyramidal shape.

Each inner dome 41 in the first group of (interior) inner domes has an endless side wall 41S arranged to lie in spaced-apart relation to inner perimeter ridge 44 as shown, for example, in FIG. 6B so as to allow pressurized air 19 flowing in seat-back air plenum 23 to flow around the endless side walls 41S as suggested in FIG. 7. Each of the endless side walls 41S included in interior inner domes 41 comprises, in series, a first wall section 411, a second wall section 412 coupled to first wall section 411, a third wall section 413 coupled to second wall section 412, and a fourth wall section 414 coupled to third and first wall sections 413, 411 as suggested in FIGS. 6B and 7. In an illustrative embodiment, each of wall sections 411-414 has a substantially trapezoidal shape as suggested in FIGS. 2 and 6B.

Each inner dome 42 in the second group of (peripheral) inner domes has a side wall 42S coupled to inner perimeter ridge 44 as shown, for example, in FIG. 6B. Each of those side walls 42S comprises a first wall section 421 coupled to inner perimeter ridge 44, a third wall section 423 coupled to inner perimeter ridge 44, and a second wall section 422 arranged to interconnect first and third wall sections 421, 423 and lie in spaced-apart confronting relation to a wall section (414 or 412) of a neighboring inner dome 41 in the first group of (interior) inner domes. The second group of (peripheral) inner domes comprises inner domes 42 arranged to mate with the inner perimeter ridge 44 to block flow of pressurized air flowing in air plenum 23 between inner perimeter ridge 44 and each of inner domes 42 in the second group of (peripheral) inner domes and yet allow flow of pressurized air flowing in air plenum 23 to flow in a space provided between each inner dome 42 in the second group of (peripheral) inner domes and any neighboring inner dome 41.

Each outer dome 51, 52 in outer sheet 22 includes a top wall 51T (or 52T) arranged to lie in spaced-apart relation to outer web 50 and a side wall 51S (or 52S) arranged to interconnect the companion top wall 51T (or 52T) and inner web 50 as suggested in FIG. 6B. Outer domes 51 comprise a first group of (interior) outer domes in a central interior region of outer sheet 22 and outer domes 52 comprise a second group of (peripheral) outer domes in peripheral regions of outer sheet 22 as suggested in FIG. 6B. In illustrative embodiments, each dome 51, 52 has a frustopyramidal shape.

Each outer dome 51 in the first group of (interior) outer domes has an endless side wall 51S arranged to lie in spaced-apart relation to outer perimeter ridge 54 as shown, for example, in FIG. 6B so as to allow pressurized air 19 flowing in seat-back air plenum 23 to flow around the endless side wall 51S as suggested in FIG. 7. Each of the endless side walls 51S comprises, in series, a first wall section 511, a second wall section 512 coupled to first wall section 511, a third wall section 513 coupled to second wall section 512, and a fourth wall section 514 coupled to third and first wall sections 513, 511 as suggested in FIGS. 6B and 7.

Outer web 50 comprises a grid-shaped network of spaced horizontal and perpendicular strips intersecting with one another in an illustrative embodiment as suggested in FIG. 6A. A cluster of neighboring outer domes in the array of spaced-apart outer domes comprises a first outer dome 51A in a first quadrant of outer sheet 22, a second outer dome 51B in a second quadrant of outer sheet 22, a third outer dome 51C in a third quadrant of outer sheet 22, and a fourth outer dome 51D in a fourth quadrant of outer sheet 22. A portion of a first horizontal strip in outer web 50 extends along a horizontal path passing between first and second inner domes 51A, 51B and between third and fourth outer domes 51C, 51D. A portion of a first perpendicular strip in outer web 50 extends along a vertical path passing between first and third outer domes 51A, 51C and between second and fourth outer domes 51B, 51D and sharing a common field CF with the horizontal strip that is located at the intersection of the portion of the first horizontal strip and the portion of the first perpendicular strip as suggested in FIG. 6B. The common field CF is formed to include one of the air-discharge ports 26 in an illustrative embodiment as shown, for example, in FIG. 6B.

Each outer dome 52 in the second group of (peripheral) outer domes has a side wall 52S coupled to outer perimeter ridge 54 as shown, for example, in FIG. 6B. Each of those side walls 52S comprises a first wall section 521 coupled to outer perimeter ridge 54, a third wall section 523 coupled to outer perimeter ridge 54, and a second wall section 522 arranged to interconnect first and third wall sections 521, 523 and lie in spaced-apart confronting relation to a wall section (514 or 512) of a neighboring outer dome 51 in the first group of (interior) outer domes. The second group of the (peripheral) outer domes comprises outer domes 52 arranged to mate with the outer perimeter ridge 54 to block flow of pressurized air flowing in air plenum 23 between outer perimeter ridge 54 and each of outer domes 52 in the second group of (peripheral) outer domes and yet allow flow of pressurized air flowing in air plenum 23 to flow in a space provided between each outer dome 52 in the second group of (peripheral) outer domes and any neighboring outer dome 51.

Each interior deformable post 61 included in seat-back cushion 20 includes an interior inner dome 41 from the first group of (interior) inner domes and a companion interior outer dome 51 from the first group of (interior) outer domes as suggested in FIGS. 6B, 7, and 8. Each interior deformable post 61 includes four panels. Each panel has an hourglass shape in illustrative embodiments as suggested in FIG. 8. A first of the four panels faces in a northerly direction ND at a bearing of about 0° and comprises first wall section 411 of interior inner dome 41 and a companion first wall section 511 of interior outer dome 51 as suggested in FIG. 6B. A second of the four panels faces in an easterly direction ED at a bearing of about 90° and comprises second wall section 412 of interior inner dome 41 and a companion second wall section 512 of interior outer dome 51. A third of the four panels faces in a southerly direction 5D at a bearing of about 180° and comprises third wall section 413 of interior inner dome 41 and a companion third wall section 513 of interior outer dome 51. A fourth of the four panels faces in a westerly direction WD at a bearing of about 270° and comprises fourth wall section 414 of interior inner dome 41 and a companion fourth wall section 514 of interior outer dome 51.

Each peripheral deformable post 62 included in seat-back cushion 20 includes a peripheral inner dome 42 from the second group of (peripheral) inner domes and a companion peripheral outer dome 52 from the second group of (peripheral) outer domes. Each peripheral deformable post 62 includes three panels. A first of the three panels faces in a northerly direction (ND) at a bearing of about 0° and comprises first wall section 421 of peripheral inner dome 42 and a companion first wall section 521 of peripheral outer dome 52. A third of the three panels faces in a southerly direction (SD) at a bearing of about 180° and comprises third wall section 423 of peripheral inner dome 42 and a companion third wall section 523 of peripheral outer dome 52. A second of the three panels comprises second wall section 422 of peripheral inner dome 42 and a companion second wall section 522 of peripheral outer dome 52.

In illustrative embodiments, seat-back air plenum 23 is grid-shaped as shown in FIGS. 2, 4, and 7. Seat-back air plenum 23 is coupled in fluid communication to pressurized air source 18. An outer surface 23 of seat-back cushion 20 is formed to include a plurality of air-discharge ports 26 that open into grid-shaped air plenum 23 as shown in FIGS. 7 and 8. As an example, pressurized air steams 19 move from grid-shaped air plenum 23 through air-discharge ports 26 into a porous cushion cover 72 as shown in FIGS. 3, 4, 7, and 8. Porous cushion cover 72 and seat-back cushion 20 cooperate to establish a pad 76 as suggested in FIG. 5.

In use, pressurized air source 18 includes a controller 18C that is used by a user to actuate an air pump 18P or any other suitable alternative to generate a flow of pressurized air 19 that is conducted into a manifold 18M, through hose 24, and then through an air-inlet conduit 25 into grid-shaped air plenum 23 of seat-back cushion 20 as suggested in FIGS. 2, 4, and 7. This flow of pressurized air 19 causes seat-back air plenum 23 to have a relatively higher uniform pressure throughout so that relatively uniform pressurized air streams 19 move through the plurality of air-discharge ports 26 as shown in FIGS. 3, 4, and 7. It is within the present disclosure to use any suitable pressurized air source to provide pressurized air to seat-back air plenum 23. It is within the scope of this disclosure to select a suitable temperature of pressurized air 19 and to vary that selected temperature.

In one illustrative embodiment, seat back 16 includes a frame 70 formed to include a central aperture 71, a porous cushion cover 72, cushion 20, and a seat pan 73 as shown, for example, in FIG. 5 and suggested in FIGS. 2, 4, and 7. A seat-pan support frame 74 may also be included in vehicle seat 10 to support a seat pan 73 included in seat back 16 as suggested in FIG. 5. Cushion 20 is anchored to underlying seat pan 73 using any suitable means and porous cushion cover 72 is coupled to cushion 20 and/or seat pan 73 using any suitable means. Porous cushion cover 72 is arranged to cover cushion 20 as suggested in FIGS. 1-5.

As suggested in FIGS. 6-8, cushion 20 comprises a monolithic first sheet 21 made of an elastomeric material such as thermoplastics polyurethane (TPU) and a monolithic second sheet 22 made of the same elastomeric material. Monolithic first and second sheets 21, 22 are mated together as suggested in FIG. 6A to form a deformable elastic bed and form a grid-shaped seat-back air plenum 23 therebetween as suggested in FIG. 5.

As suggested in FIGS. 7-10, flows of pressurized air 19 moves from air-inlet conduit 25 into grid-shaped seat-back air plenum 23. As shown in FIG. 7, an illustrative grid-shaped seat-back air plenum 23 includes a series of air-transfer conduits 231A, 231B, 231C, 231D, 231E, 232A, 232B, 232C, 232D, 232E, 232F, and 232G that are arranged in rows (232) and columns (231). Air-discharge ports 26 formed in monolithic first sheet 21 open into grid-shaped seat-back air plenum 23 where columns and rows of air-transfer conduits 231A, 231B, 231C, 231D, 231E, 232A, 232B, 232C, 232D, 232E, 232F, and 232G intersect one another. As shown for example in FIG. 7, an intersection 231 is established where air-transfer conduit column 231E and air-transfer conduit row 232G intersect one another, for example.

After flows of pressurized air 19 move from air-inlet conduit 25 into grid-shaped seat-back air plenum 23, a plurality of pressurized air streams 19 move throughout air plenum 23 by moving through air-transfer conduit columns 231A-E and air-transfer conduit rows 232A-G as shown, for example, in FIGS. 7-10. Pressurized air streams 19 then move from the air-transfer conduit columns and rows through air-discharge ports 26 and into and through porous cushion cover 72 to establish discharged air 19 as shown, for example, in FIGS. 3, 4, 7-10, and 14-16.

Pressurized air streams 19 are relatively uniform relative to one another as a result of the air-transfer conduit columns and rows having relatively large cross-sections thus minimizing pressure losses as air streams 19 move through the air-transfer conduit columns and rows. As a result of air streams 19 being relatively uniform relative to one another, volumetric flow of discharged air 19 is relatively uniform, thus causing maximized user comfort.

Discharged air 19 is formed as a result of air stream 19 moving from air-discharge port 26 into and through porous cushion cover 72, as shown in FIGS. 2, 3, and 7-10. Illustratively, porous cushion cover 72 includes an outer layer 721 and an inner layer 722 coupled to outer layer 721. As suggested in FIGS. 2, 4, 5, and 7-10, outer layer 721 is configured to lie in confronting relation with a user (not shown) sitting in vehicle seat 10. Inner layer 722 is positioned to lie between outer layer 721 and outer sheet 21 and is used, for example, to maximize the appearance and comfort of the completed pad 76. Inner and outer layers 722, 721 are made from porous materials that are configured to allow air to flow through the materials with minimized pressure loss across layers 722, 721 as suggested in FIGS. 8 and 10.

Each of inner and outer sheets 21, 22 is configured to mate with air-inlet conduit 25 as suggested in FIGS. 6B, 7, and 8 to allow pressurized air 19 flowing through air-inlet conduit 25 to enter into seat-back air plenum 23. Inner perimeter ridge 44 of inner sheet 21 includes a nearly endless sealing surface 44s interrupted by a curved aperture-forming surface 44af as shown, for example, in FIG. 6B. Outer perimeter ridge 54 of outer sheet 22 includes a nearly endless sealing surface 54s interrupted by a curved aperture-forming surface 54af. When inner and outer sheets 21, 22 mate, curved aperture-forming surfaces 44af, 54af are arranged to lie in confronting relation to one another to form an air-supply port 25P receiving tubular air-inlet conduit 25 therein as suggested in FIG. 8.

Air-inlet conduit 25 is arranged illustratively to extend into air-supply port 25F and is formed to include a passageway configured to provide means for conducting flows of pressurized air 19 into air plenum 23 to provide ventilation to a user (not shown) seated in vehicle seat 10. In a first illustrative embodiment, air-inlet conduit 25 is arranged to extend away from air plenum 23 and through a side portion of seat-back cushion 20 as shown, for example, in FIGS. 1-8.

In another embodiment, a seat-back cushion 20 is configured to receive pressurized air 19 through an air-supply port 27P formed in inner sheet 21 as suggested in FIGS. 9, 10, and 10A. Seat-back cushion 20 is similar in function and design to seat-back cushion 20. Inner sheet 21 includes an endless sealing surface 44s that mates with an endless sealing surface 54s included in companion outer sheet 22 as suggested in FIG. 10A.

An air-inlet conduit 27 is configured to be coupled to inner sheet 21 at air-supply port 27 as suggested in FIG. 10A to provide means for conducting pressurized air from pressurized air source 18 into a seat-back air plenum 23 formed between inner and outer sheets 21, 22 as suggested in FIGS. 9 and 10. A free upstream end of air-inlet conduit 27 is coupled to hose 24 as suggested in FIGS. 9 and 10.

A seat pan 173 is provided to support cushion 20 as shown, for example, in FIGS. 9 and 10. Seat pan 173 is formed to include a conduit channel 127 aligned to communicate with air-supply port 27 formed in inner sheet 21 of seat-back cushion 20 as suggested in FIG. 10. Air-supply conduit 27 is arranged to lie in and extend through conduit channel 127 formed in seat pan 173 when seat-back cushion 20 is placed on seat pan 173 as shown, for example, in FIG. 10.

An illustrative seat bottom 14 in accordance with the present disclosure is shown, for example, in FIGS. 11-13. Seat bottom 14 is similar structurally and functionally to seat back 16 and includes inner and outer sheets 421, 422 in illustrative embodiments. Seat bottom 14 includes a frame 470 formed to include a central aperture 471, a porous cushion cover 472, a seat-bottom cushion 30 formed to include a (grid-shaped) seat-bottom air plenum 423, and a seat pan 473 as shown, for example, in FIG. 11. Porous cushion cover 472 and seat-bottom cushion 30 cooperate to establish a pad 476 as suggested in FIG. 11. An inner sheet 421 is mated to an outer sheet 422 as suggested in FIGS. 12 and 13 to form seat-bottom cushion 30. In an alternative embodiment, inner sheet 421 can be formed to include an air supply port 27 like port 27 formed in inner sheet 21 shown in FIG. 10A. Outer sheet 422 is formed to include air-discharge ports 36. A seat-pan support frame 475 may also be included in vehicle 10 to support seat pan 473. Seat pan 473 can be configured within the scope of this disclosure in the manner shown for seat pan 173 in FIGS. 9 and 10 to a conduit channel 127 like channel 127 and to mate with an air-inlet conduit like conduit 27.

In one illustrative embodiment, a vehicle seat 110 includes a seat bottom 112 and a seat back 114 as shown diagrammatically, for example, in FIG. 14. Seat back 114 includes occupant-support base 114B and pressurized air source 18. Occupant-support base 114B includes pad 216P comprising cushion 20 and porous cushion cover 72 and seat pan 73. Illustratively, occupant-support base 114B is coupled to and supported by seat pan 73 and pressurized air source 18 is coupled in fluid communication with cushion 20 and coupled to seat pan 73 as suggested in FIG. 14.

Figure 15:
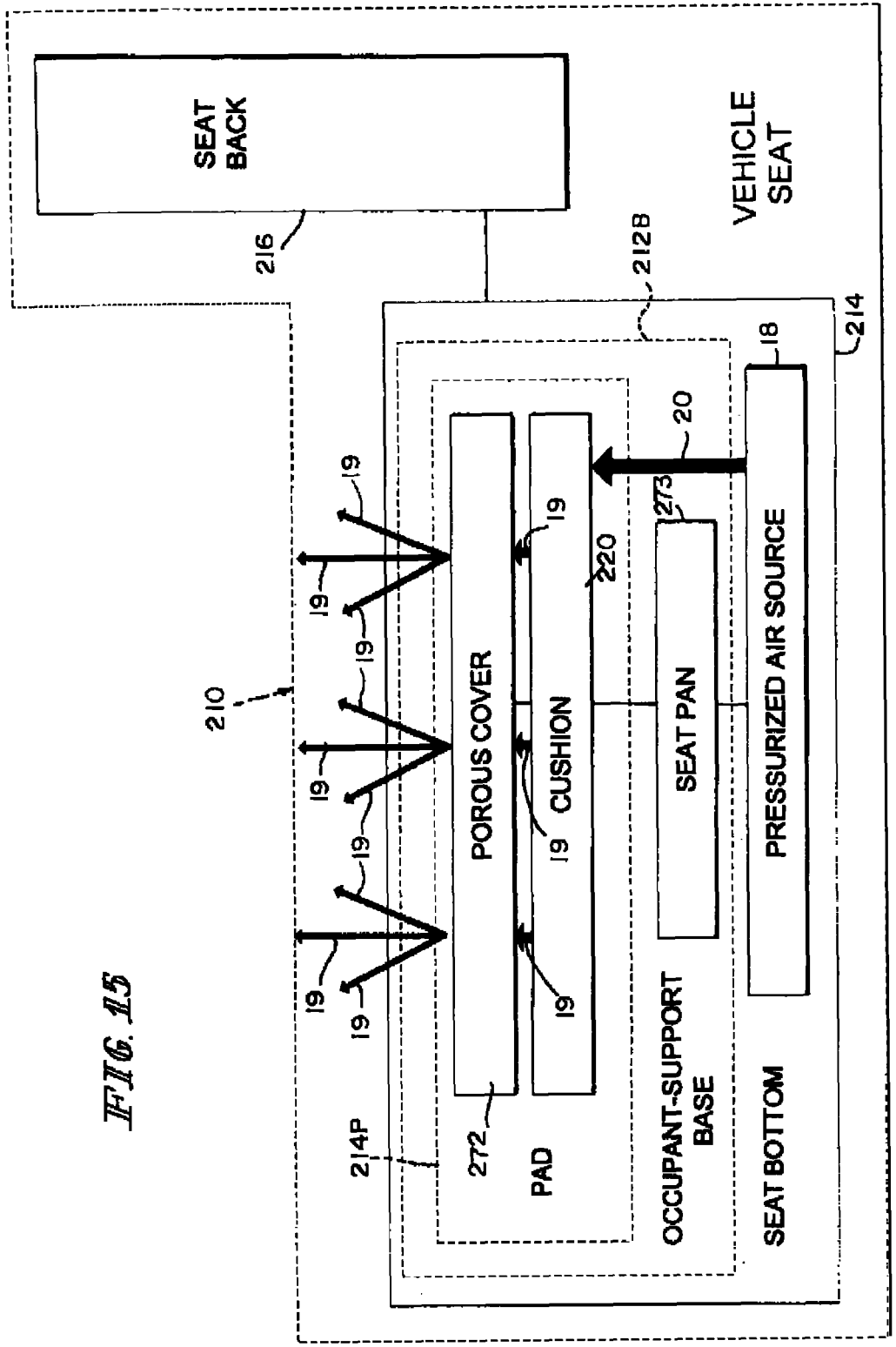
FIG. 15 is a diagrammatic view of a ventilated vehicle seat in accordance with another embodiment of the present disclosure showing an occupant-support base comprising a seat bottom including a seat pan and a pad comprising a seat-bottom cushion and a porous cover and showing that pressurized air flows from a source of pressurized air through the seat-bottom cushion and the porous cover to reach a passenger seated on the ventilated vehicle seat.

In another illustrative embodiment, a vehicle seat 210 includes a seat bottom 214 and a seat back 216 as shown, for example, in FIG. 15. Seat bottom 214 includes occupant-support base 212B and pressurized air source 18. Occupant-support base 212B includes pad 214P comprising cushion 220 and porous cushion cover 272 and seat pan 273. Illustratively, occupant-support base 212B is coupled to and supported by seat pan 273 and pressurized air source 18 is coupled in fluid communication with cushion 220 and coupled to seat pan 273 as suggested in FIG. 15.

Figure 16:
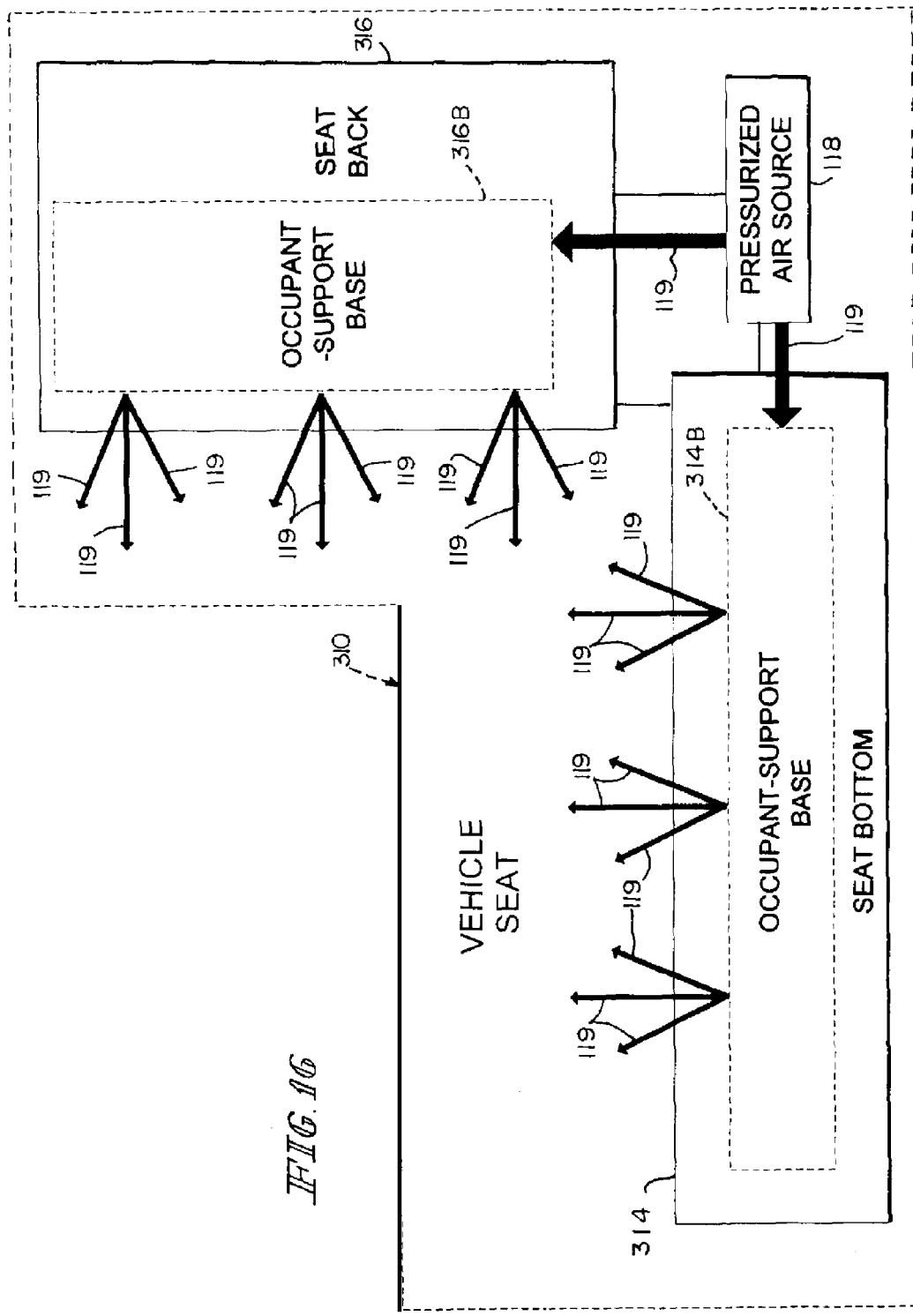
FIG. 16 is a diagrammatic view of a ventilated vehicle seat in accordance with another embodiment of the present disclosure showing that a common pressurized air source separated from the seat bottom and seat back is used to provide pressurized air to the occupant-support bases included in each of the seat bottom and seat back.

In still yet another embodiment, a vehicle seat 310 includes a seat bottom 314 including an occupant-support base 314B and a seat back 316 including an occupant-support base 316B as shown, for example, in FIG. 16. Illustratively, each occupant-support base 314B, 316B included in vehicle seat 310 is coupled in fluid communication to a pressurized air source 118 positioned to lie in spaced-apart relation to vehicle seat 310. As an example, pressurized air source 118 may be the Heating, Ventilation, and Air Conditioning System (HVAC System) included in the vehicle. The HVAC System is configured to illustratively provide pressurized air having appropriate characteristics to a passenger cabin included in the vehicle to cause a user seated on vehicle seat 310 to have maximized comfort. As a result of pressurized air source 118 being the HVAC System, overall system design may be simplified as the quantity of pressurized air sources may be minimized.

Pressurized air sources 18, 118 may be configured to provide means for heating, cooling, or otherwise treating pressurized air produced by the pressurized air sources. As an example, pressurized air source 18 may include a heating/cooling module that operates to heat or cool air. The heating/cooling module may be coupled to air pump 18P upstream of air pump 18P to cool or heat air prior to air pump 18P pressurizing the air or the heating/cooling module may be coupled to air pump 18P downstream of air pump 18P after air pump 18P has pressurized the air. As another example, pressurized air 119 may be heated or cooled as a result of pressurized air source 118 being the HVAC system included in the vehicle.

The invention claimed is:

1. A ventilated vehicle seat comprising
a first cushion including an outer sheet and an inner sheet coupled to the outer sheet to establish a deformable elastic bed and form therebetween an air plenum configured to receive pressurized air from a source of pressurized air,
wherein the outer sheet is formed to include a plurality of air-discharge ports opening into the air plenum and communicating pressurized air from the air plenum to a passenger seated on the first cushion,
the inner sheet includes an inner web providing an inner exterior surface, an array of spaced-apart inner domes coupled to the inner web and arranged to extend toward the outer sheet, and an inner perimeter ridge coupled to a perimeter border of the inner web and arranged to surround the array of spaced-apart inner domes and extend from the inner web toward the outer sheet,
the outer sheet includes an outer web providing an outer exterior surface, an array of spaced-apart outer domes coupled to the outer web and arranged to extend toward the inner sheet, and an outer perimeter ridge coupled to a perimeter border of the outer web and arranged to surround the array of spaced-apart outer domes and extend from the outer web toward the inner sheet, and
the inner and outer sheets are arranged to align the inner and outer domes in registry with one another to cause each outer dome to mate with a companion inner dome to form a deformable post extending from the outer web to the inner web and to cause the inner and outer perimeter ridges to mate to establish the air plenum in a space bounded by the inner and outer webs, the deformable posts located between and coupled to the inner and outer webs, and the mating inner and outer perimeter ridges.

2. The ventilated vehicle seat of claim 1, wherein the inner and outer perimeter ridges cooperate to form an air-supply port opening into the air plenum to communicate pressurized air from the source of pressurized air into the air plenum.

3. The ventilated vehicle seat of claim 1, wherein the inner web is formed to include an air-supply port opening into the air plenum to communicate pressurized air from the source of pressurized air into the air plenum and further comprising a seat pan arranged to underlie the cushion and mate with an exterior surface of the inner web of the inner sheet and wherein the seat pan is formed to include a conduit channel aligned to communicate with the air-supply port formed in the inner web and an air-supply conduit arranged to extend through the conduit channel to discharge pressurized air from the source of pressurized air into the air plenum through the air-supply port.

4. The ventilated vehicle seat of claim 1, wherein the inner perimeter ridge is endless and comprises, in series, a first segment, a second segment coupled to the first segment, a third segment coupled to the second segment, and a fourth segment coupled to the third and first segments, the first and third segments are arranged to lie in spaced-apart confronting relation to one another to locate the array of spaced-apart inner domes therebetween, and the second and fourth segments are arranged to lie in spaced-apart confronting relation to one another to locate the array of spaced-apart inner domes therebetween.

5. The ventilated vehicle seat of claim 4, wherein the inner perimeter ridge is substantially rectangle-shaped.

6. The ventilated vehicle seat of claim 1, further comprising a first seat pan arranged to mate with the inner web of the inner sheet of the first cushion and to cause pressurized air discharged from the air plenum to flow in a direction away from the first seat pan.

7. The ventilated vehicle seat of claim 6, wherein the first seat pan and the first cushion cooperate to define a seat bottom and further comprising a seat back arranged to extend upwardly from the seat bottom, wherein the seat back includes a second seat pan and a second seat cushion coupled to the second seat pan, the second cushion includes a second outer sheet and a second inner sheet coupled to the second outer sheet to establish a deformable elastic bed and form therebetween a second air plenum separated from the air plenum of the first cushion and configured to receive pressurized air from the source of pressurized air, the second outer sheet is formed to include a plurality of second air-discharge ports opening into the second air plenum and communicating pressurized air from the second air plenum to a passenger seated on the second cushion, the second inner sheet includes an inner web providing an inner exterior surface, an array of spaced-apart inner domes coupled to the inner web of the second inner sheet and arranged to extend toward the second outer sheet, and an inner perimeter ridge coupled to a perimeter border of the inner web of the second inner sheet and arranged to surround the array of spaced-apart inner domes of the second inner sheet and extend from the inner web of the second inner sheet toward the second outer sheet, the second outer sheet includes an outer web providing an outer exterior surface, an array of spaced-apart outer domes coupled to the outer web of the second outer sheet and arranged to extend toward the second inner sheet, and an outer perimeter ridge coupled to a perimeter border of the outer web of the second outer sheet and arranged to surround the array of spaced-apart outer domes of the second outer sheet and extend from the outer web of the second outer sheet toward the second inner sheet, and the second inner and outer sheets are arranged to align the inner and outer domes included in the second inner and outer sheets in registry with one another to cause each outer dome of the second outer sheet to mate with a companion inner dome of the second inner sheet to form a deformable post extending from the outer web of the second outer sheet and to cause the inner and outer perimeter ridges of the second inner and outer sheets to mate to establish the second air plenum in a space bounded by the inner and outer webs of the second inner and outer sheets, the deformable posts located between and coupled to the inner and outer webs of the second inner and outer sheets, and the mating inner and outer perimeter ridges of the second inner and outer sheets, and the second seat pan is arranged to mate with the inner web of the second inner web of the second cushion and to cause pressurized air discharged from the second air plenum to flow in a direction away from the second seat pan.

8. The ventilated vehicle seat of claim 7, further comprising an air-supply system including a pressurized air source having a manifold configured to store pressurized air therein, a first air-supply conduit coupled in fluid communication to the manifold and to the air plenum in the first cushion to provide a first supply of pressurized air to the seat bottom, and a second air-supply conduit coupled in fluid communication to the manifold and to the second air plenum to provide a separate second supply of pressurized air to the seat back.

9. The ventilated vehicle seat of claim 1, further comprising a seat pan, wherein the cushion is arranged on the seat pan to cause the inner exterior surface of the inner web to extend along and face toward the seat pan and to cause each of the deformable posts to extend in an outer direction away from the seat pan.

10. The ventilated vehicle seat of claim 9, wherein the inner web is formed to include an air-intake port opening into the air plenum and configured to receive pressurized air from a source of pressurized air.

11. The ventilated vehicle seat of claim 10, wherein the seat pan is formed to include a conduit-receiving channel and the cushion further includes an air-supply conduit arranged to extend through the conduit-receiving channel formed in the seat pan and mate with the inner web at the air-intake port to deliver pressurized air into the air plenum.

12. The ventilated vehicle seat of claim 1, wherein the outer web comprises a grid-shaped network of spaced horizontal and perpendicular strips intersecting with one another.

13. The vehicle seat of claim 12, wherein a cluster of neighboring outer domes in the array of spaced-apart outer domes comprises a first outer dome in a first quadrant of the outer sheet, a second outer dome in a second quadrant of the outer sheet, a third outer dome in a third quadrant of the outer sheet, and a fourth outer dome in a fourth quadrant of the outer sheet, a portion of a first horizontal strip in the outer web extends along a horizontal path passing between the first and second inner domes and between the third and fourth outer domes, and a portion of a first perpendicular strip in the outer web extends along a vertical path passing between the first and third outer domes and between the second and fourth outer domes and sharing a common field with the horizontal strip that is located at the intersection of the portion of the first horizontal strip and the portion of the first perpendicular strip.

14. The ventilated vehicle seat of claim 13, wherein the common field is formed to include one of the air-discharge ports formed in the outer sheet.

15. The ventilated vehicle seat of claim 1, wherein each inner dome includes a top wall arranged to lie in spaced-apart relation to the inner web and a side wall arranged to interconnect the top wall and the inner web, each outer dome includes a top wall arranged to lie in spaced-apart relation to the outer web and in mating engagement with the top wall of a companion inner dome, and each outer dome also includes a side wall arranged to interconnect the top wall thereof and the outer web.

16. The ventilated vehicle seat of claim 15, wherein the top wall of each inner dome has a substantially flat exterior surface and the top wall of each outer dome has a substantially flat exterior surface arranged to mate with the substantially flat exterior surface of a companion inner dome.

17. The ventilated vehicle seat of claim 15, wherein a first group of the inner domes comprises inner domes arranged to lie in spaced-apart relation to the inner perimeter ridge to allow pressurized air flowing in the air plenum to flow completely around an entire perimeter edge of the top wall of each inner dome in the first group of inner domes and a second group of the inner domes comprises inner domes arranged to mate with the inner perimeter ridge to block flow of pressurized air flowing in the air plenum between the inner perimeter ridge and each of the inner domes in the second group of inner domes and yet allow flow of pressurized air flowing in the air plenum to flow in a space provided between each inner dome in the second group of inner domes and any neighboring inner dome.

18. The ventilated vehicle seat of claim 17, wherein a first group of the outer domes comprises outer domes arranged to lie in spaced-apart relation to the outer perimeter ridge to allow pressurized air flowing in the air plenum to flow completely around an entire perimeter edge of the top wall of each outer dome in the first group of outer domes and a second group of the outer domes comprises outer domes arranged to mate with the outer perimeter ridge to block flow of pressurized air flowing in the air plenum between the outer perimeter ridge and each of the outer domes in the second group of outer domes and yet allow flow of pressurized air flowing in the air plenum to flow in a space provided between each outer dome in the second group of outer domes and any neighboring outer dome.

19. The ventilated vehicle seat of claim 15, wherein a first group of the inner domes have endless side walls arranged to lie in spaced-apart relation to the inner perimeter ridge to allow pressurized air flowing in the air plenum to flow around the endless side walls of the first group of the inner domes.

20. The ventilated vehicle seat of claim 19, wherein each of the endless side walls comprises, in series, a first wall section, a second wall section coupled to the first wall section, a third wall section coupled to the second wall section, and a fourth wall section coupled to the third and first wall sections.

21. The ventilated vehicle seat of claim 20, wherein each of the wall sections has a substantially trapezoidal shape.

22. The ventilated vehicle seat of claim 20, wherein a first group of the outer domes have endless side walls arranged to lie in spaced-apart relation to the outer perimeter ridge to allow pressurized air flowing in the air plenum to flow around the endless side walls of the first group of the outer domes, each of the endless side walls in outer domes in the first group of outer domes comprises, in series, a first wall section, a second wall section coupled to the first wall section, a third wall section coupled to the second wall section, and a fourth wall section coupled to the third and first wall sections, each deformable post made of an inner dome from the first group of inner domes and a companion outer dome from the first group of outer domes includes four panels, a first of the four panels faces in a northerly direction at a bearing of about 0° and comprises the first wall section of the inner dome and a companion first wall section of the outer dome, a second of the four panels faces in an easterly direction at a bearing of about 90° and comprises the second wall section of the inner dome and a companion second wall section of the outer dome, a third of the four panels faces in a southerly direction at a bearing of about 180° and comprises the third wall section of the inner dome and a companion fourth wall section of the outer dome, and a fourth of the four panels faces in a westerly direction at a bearing of about 270° and comprises the fourth wall section of the inner dome and a companion fourth wall section of the outer dome.

23. The ventilated vehicle seat of claim 22, wherein each of the four panels has an hourglass shape.

* * * * *